June 27, 1933. V. H. CHRISTEN 1,915,775
WINDSHIELD WIPER
Filed March 22, 1929
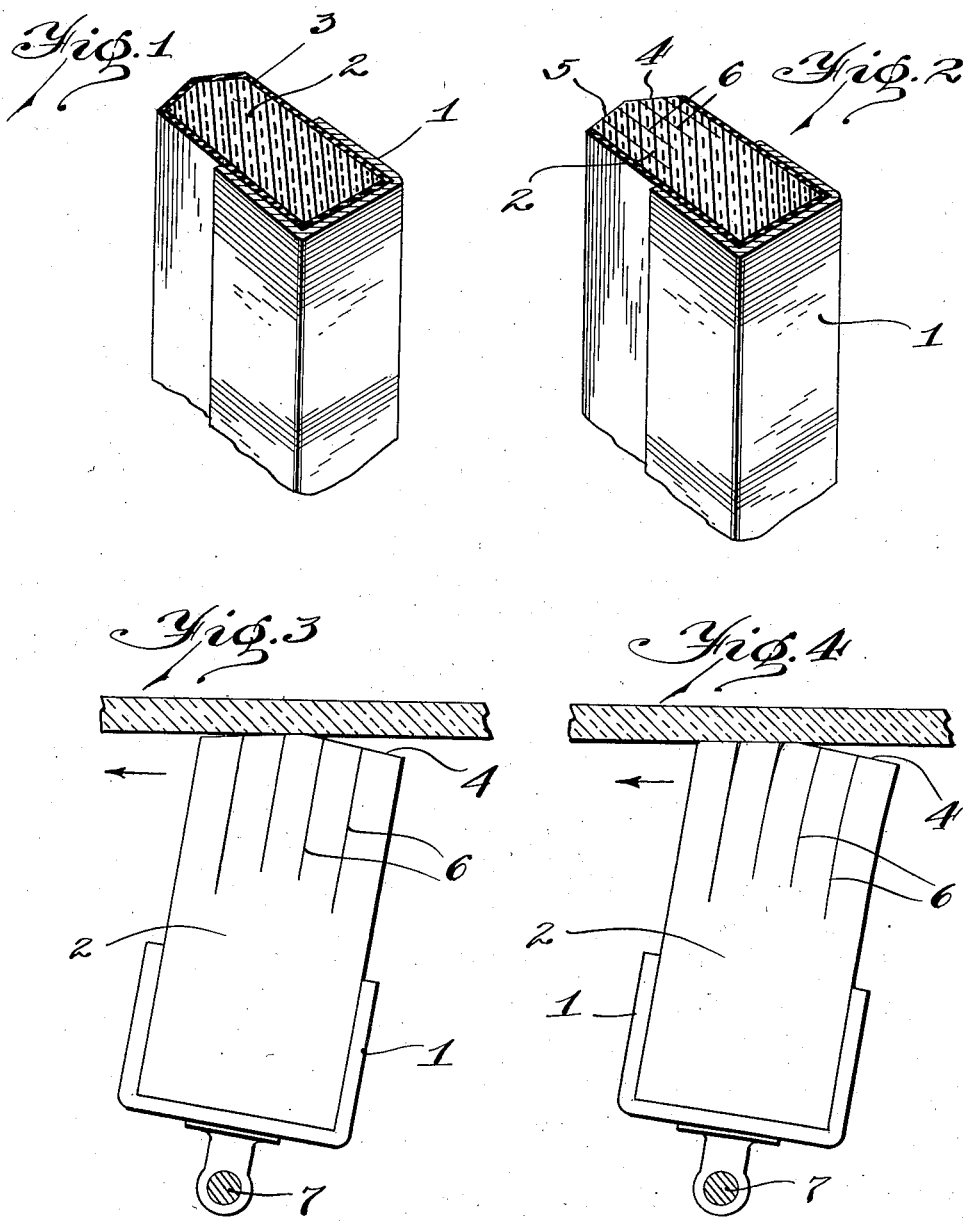
INVENTOR.
Victor H. Christen
BY
ATTORNEY.

Patented June 27, 1933

1,915,775

UNITED STATES PATENT OFFICE

VICTOR H. CHRISTEN, OF DETROIT, MICHIGAN, ASSIGNOR TO C. EMIL CHRISTEN, OF TOLEDO, OHIO

WINDSHIELD WIPER

Application filed March 22, 1929. Serial No. 349,012.

This invention relates to a windshield wiper of the type adapted to both treat and wipe the surface of the windshield.

Heretofore, windshield wipers have been manufactured in three separate classes, the first class including wipers of the flexible rubber type having one or a plurality of wiping strips, the second class embodying felt and felt impregnated wipers which treat the surface of the glass but do not wipe the same within the general meaning of the term "wipe", and the third class including that type of wiper as illustrated in my Patent No. 1,681,395 of August 21, 1928, wherein the wiper is formed of an impregnated strip for treating the surface of the glass and a flexible strip for wiping the surface of the glass. While the latter type of wiper has been very successful in commercial operation, it has embodied several relatively expensive steps in the fabrication thereof, and it is also open to the objection of having to be worn in before giving the best results, as the felt, if a little too high, tends to streak the glass.

It is the object of the present invention to provide an integral wiper member which performs all of the functions of the combined felt impregnated and rubber wiping member, as disclosed in said prior patent, and at the same time eliminates the objections thereto. This improved integral wiper blade is formed entirely of rubber and is fabricated by such a novel process as to produce a rubber wiper blade which is inherently impregnated with a substance for treating the glass to prevent the formation of raindrops thereon. Such integral wiper blade is thus just as effective to treat and wipe the surface of the glass when initially installed as it is after extended use.

The invention further contemplates the method of fabricating a wiper blade in that the treating substance is mixed with the raw rubber compound before vulcanization, and the vulcanized blade is then fabricated in a novel manner to open up the pores and deliver the treating material as the blade is used.

Other features of the invention will be brought out in the specification and claims.

In the drawing:

Fig. 1 is an enlarged perspective view, partly in section, illustrating one form of my wiper member after vulcanization and before the same is prepared for use.

Fig. 2 is a view similar to Fig. 1 but showing the wiping surfaces ground away to open the pores and also showing the slots running from the ground contacting surfaces inwardly of the wiper member.

Fig. 3 is an enlarged end elevation of my novel wiper member just after it has reversed its position for a return stroke and showing the preferred contact between the wiper member and the glass at the beginning of the stroke.

Fig. 4 is a view similar to Fig. 3 but showing the preferred position the blade assumes during the treating and wiping action.

In forming the wiper blade, I preferably first mix the chemical or other substance for treating the windshield glass with the raw rubber before it is molded or otherwise formed in shape by vulcanizing. Such a composition is preferably mixed with the raw rubber in the form of a powder and any standard substance such as pulverized tobacco stems or the composition disclosed in my Patent No. 1,201,440 of October 17, 1916 may be used.

After the treating material is mixed with the raw rubber prior to vulcanization, the wiper blade is preferably vulcanized to form a strip substantially rectangular in cross section. If desired, one end of such vulcanized strip may be tapered as best shown in Fig. 1, but substantially the same results will be obtained whether such ends are square or tapered. After the strip is vulcanized, it may be cut the required length and either placed directly in a wiper blade holder 1 or any suitable clamp so that it may be properly held for working the grinding surfaces.

As shown in Fig. 1, the wiper blade is held in a standard metal wiper holder and consists of an interior impregnated body 2 and an outer vulcanized surface 3. Such vulcanized surface, of course, closes in the pores, and I then preferably grind off one edge of the vulcanized strip to form two angularly positioned surfaces 4 and 5. Such ground off surfaces will open up the pores so that the treating substance will be fed to such wiping surface and in addition I preferably slot the wiper blade with the transverse slots 6.

Such slots 6 may be of any depth desired but they are preferably very narrow and are not for the purpose of separating the wiper into a plurality of independently wiper blades, but are mainly for the purpose of providing a more accessible outlet for the treating substance. The wiper blade and its holder 1 are, of course, so connected to the standard actuating arm 7 as to be oscillated or reciprocated back and forth across the surface of the front of the windshield. In addition, the wiper holder 1 is so connected to the actuating arm 7 that such wiper blade will have a lost motion or rocking movement substantially equal to the angle formed at the wiping surface of the blade by the grinding operation. In other words, as best shown in Figs. 3 and 4, the wiper blade, instead of being held at right angles to the windshield, is permitted to rock sufficiently so that the working surface of the blade is substantially parallel to the windshield.

In the preferred embodiment of the present invention, this rocking movement is such that as the wiper blade starts on its return stroke, as shown in Fig. 3, the point or crown of the blade touches the glass first, or stated in another way, the angle of the wiping surface is not quite parallel to the windshield so that as the wiper blade proceeds on its stroke, as shown in Fig. 4, the friction will slightly deform the crown or central part of the blade so as to produce substantially uniform contact over the entire angular wiping surface and to very slightly open up the slots. This operation is not at all essential, as it will be obvious that substantially equally as good results will be obtained by perfectly flat surface between the wiping surface of the glass at the beginning of the stroke. On the return stroke, the other angular surface of the blade will contact with the glass in the same manner, the porous wiping surface of the slots serving to constantly treat the surface of the glass to prevent the formation of raindrops thereon and the simultaneous wiping action serving to remove all dust particles and present a clean transparent surface.

It will thus be seen that I have provided an integral one-piece wiper blade which will treat the surface of the glass in a very efficient manner to prevent the raindrops from interfering with the transparency thereof and thus entirely eliminating the separate strip of treating material and the incident difficulty in forming this felt treating strip to just the right height above the rubber blade. The illustrations in the drawing are considerably enlarged, and in its preferred form my wiper blade is substantially the same thickness as the combined thickness of the rubber strip and flat strip, as heretofore used.

This produces what I would term a relatively wide or thick wiper blade, and by merely grinding away one edge of such blade, by a very simple operation, it will be seen that I am able to obtain the correct angle in addition to opening up the pores of the vulcanized blade, whereas to more effectively apply the treating substance to the glass.

By completely eliminating the felt treating strip it will be obvious that all streaks and unevenness caused by a new wiper blade are eliminated for the reason that my integral wiper blade directly wipes and cleans off the dust such as only rubber can do, and at the same time chemically treats the surface of the windshield so as to prevent the formation of raindrops and presents a smooth transparent surface the very first instant the device is installed. The forming of the wiper blade in one piece, the grinding of the working surface, and the longitudinal slotting of the same, are very simple and inexpensive operations and the wiping action produced by such blade is very positive, and this, together with the treating action, materially reduces both the speed and period of operation of the wiper.

What I claim is:

1. The method of forming a windshield wiper blade which consists in, mixing a substance for treating the surface of the glass to prevent the formation of raindrops thereon with the raw rubber prior to vulcanizing a strip of rubber in a desired form, vulcanizing, and then grinding away the vulcanized surface of said strip to form one or more wiping surfaces and simultaneously opening up the pores of said strip so as to permit the feeding of said substance to the wiping surface of the blade.

2. The method of forming windshield wiper blades, which comprises mixing a substance for preventing the accumulation of water on the glass in the form of drops, with raw rubber before vulcanization, forming the raw rubber in strips and vulcanizing the same and then slotting the wiping surface or surfaces of said blade so as to permit the feeding of said treating substance to the wiping surface or surfaces.

3. The method of forming windshield wiper blades, which comprises mixing a substance for preventing the formation of raindrops on a glass surface with raw rubber, vulcanizing said rubber in the form of a wiper blade or strip and then grinding a portion of the surface of said blade and slotting the same to open up the pores thereof for accelerating the feeding of the treating substance to the windshield.

4. As a new article of manufacture, a windshield wiper blade formed of rubber occluded with a substance for treating the surface of a glass to prevent the formation of raindrops thereon.

5. In a windshield wiper, a wiper blade arranged to be drawn over the glass and comprising an integral member occluded with a substance adapted to prevent the accumulation of water on the glass in the form of drops, said member being relatively wide and provided with two wiping surfaces positioned at oblique angles to the plane of the blade.

6. In a windshield wiper, a wiper blade arranged to be drawn over the glass and comprising an integral member occluded with a substance adapted to prevent the accumulation of water on the glass in the form of drops, said member being relatively wide and provided with two wiping surfaces positioned at oblique angles to the plane of the blade, and a plurality of slits extending inwardly from said wiping surfaces whereby to assist in feeding said substance towards said surface for treating the glass.

7. In a windshield wiper, an integral wiper blade formed of a relatively wide strip of rubber, a plurality of working surfaces angularly positioned relative to each other on one edge of the blade, said surfaces being positioned at an oblique angle to the plane of the blade and a plurality of slits extending inwardly from said working surfaces.

8. In a windshield wiper, an integral wiper blade formed of a relatively wide strip of rubber, a plurality of working surfaces angularly positioned relative to each other on one edge of the blade, said surfaces being positioned at an oblique angle to the plane of the blade and a plurality of slits extending inwardly from said working surfaces, said blade being so supported as to rock transversely at the end of its movement to such an extent that in the return movement in each direction each respective wiping surface will be substantially parallel with the windshield.

9. A windshield wiper blade comprising a single strip of rubber, one edge of which is adapted to frictionally engage and wipe a windshie'd, two angularly positioned wiping surfaces on said blade edge, said single strip of rubber being longitudinally slitted with the slits extending inwardly from the said wiping surfaces, to thus provide a plurality of separate working surfaces.

10. A windshield wiper blade comprising a single strip of rubber, one edge of which is adapted to frictionally engage and wipe a windshield, two angularly positioned wiping surfaces on said blade edge, said single strip of rubber being longitudinally slitted with the slits extending inwardly from the said wiping surfaces, to thus provide a plurality of separate working surfaces, and a rockably mounted holder gripping the said strip of rubber at the edge opposite that containing the slits, said slits terminating at points spaced outwardly from said holder.

11. A windshield wiper blade formed of a single strip of rubber, one edge of which is slitted to provide a plurality of working surfaces, a holder gripping the opposite solid edge of the wiper, the working surfaces formed by the slitted portions cooperating to form a general working surface, said general working surface formed of a plurality of slitted portions and the working surface of each slitted portion being formed at an oblique angle to the plane of the blade.

In testimony whereof I affix my signature.

VICTOR H. CHRISTEN.